United States Patent
Jarman et al.

(10) Patent No.: US 12,540,651 B2
(45) Date of Patent: Feb. 3, 2026

(54) CERAMIC PARTICULATE COATING FOR WEAR IMPROVEMENT

(71) Applicant: Goodrich Corporation, Charlotte, NC (US)

(72) Inventors: Jecee Jarman, Pueblo, CO (US); Phillip E Cooley, Kettering, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 18/461,433

(22) Filed: Sep. 5, 2023

(65) Prior Publication Data

US 2025/0075759 A1  Mar. 6, 2025

(51) Int. Cl.
| | |
|---|---|
| F16D 65/12 | (2006.01) |
| C23C 4/11 | (2016.01) |
| C23C 14/06 | (2006.01) |
| C23C 14/08 | (2006.01) |
| C23C 14/30 | (2006.01) |
| C23C 14/58 | (2006.01) |
| F16D 69/04 | (2006.01) |

(52) U.S. Cl.
CPC ........ *F16D 65/127* (2013.01); *C23C 14/0652* (2013.01); *C23C 14/081* (2013.01); *C23C 14/083* (2013.01); *C23C 14/30* (2013.01); *C23C 14/5886* (2013.01); *C23C 4/11* (2016.01); *F16D 65/126* (2013.01); *F16D 2069/0483* (2013.01); *F16D 2069/0491* (2013.01); *F16D 2200/0047* (2013.01); *F16D 2200/0052* (2013.01); *F16D 2250/0046* (2013.01); *F16D 2250/0084* (2013.01)

(58) Field of Classification Search
CPC .................................................. C23C 14/0652
See application file for complete search history.

(56) References Cited

U.S. PATENT DOCUMENTS

| | | | |
|---|---|---|---|
| 3,871,934 A | 3/1975 | Marin | |
| 4,180,622 A * | 12/1979 | Burkhard ................. | C23C 4/02 |
| | | | 428/564 |
| 5,224,572 A | 7/1993 | Smolen, Jr. et al. | |
| 5,629,101 A | 5/1997 | Watremez | |
| 5,962,135 A | 10/1999 | Walker et al. | |
| (Continued) | | | |

FOREIGN PATENT DOCUMENTS

| | | |
|---|---|---|
| CN | 110305504 | 10/2020 |
| CN | 110981518 | 1/2021 |
| (Continued) | | |

OTHER PUBLICATIONS

European Patent Office, European Search Report dated Feb. 5, 2025 in Application No. 241987270.

(Continued)

*Primary Examiner* — Robert A Vetere
(74) *Attorney, Agent, or Firm* — SNELL & WILMER L.L.P.

(57) ABSTRACT

A method is provided for decreasing a wear rate of a brake stack or a heat sink wear rate and increasing a brake life of the brake stack or the heat sink. The method includes coating a wear surface of a brake disk with at least one of an engineered ceramic material or ceramic solution, thereby forming a coated brake disk and installing the coated brake disk in a multi-disk brake system.

19 Claims, 7 Drawing Sheets

(56) References Cited

U.S. PATENT DOCUMENTS

| | | |
|---|---|---|
| 6,857,509 B1 | 2/2005 | Braiato et al. |
| 6,969,546 B2 | 11/2005 | DiChiara, Jr. |
| 7,501,181 B2 | 3/2009 | Walker et al. |
| 7,900,751 B2 | 3/2011 | Walker |
| 8,084,089 B2 | 12/2011 | Meckel |
| 8,449,943 B2 | 5/2013 | Meckel |
| 8,871,044 B2 | 10/2014 | Baud et al. |
| 8,962,083 B2 | 2/2015 | Murphy |
| 9,296,660 B2 | 3/2016 | Miyamoto et al. |
| 10,670,099 B2 | 6/2020 | Yaguchi et al. |
| 10,767,059 B2 | 9/2020 | Poteet et al. |
| 11,634,213 B2 | 4/2023 | Poteet et al. |
| 2009/0130324 A1 | 5/2009 | Shanker et al. |
| 2010/0291373 A1 | 11/2010 | Baud et al. |
| 2013/0116109 A1 | 5/2013 | Ritti |
| 2013/0337180 A1 | 12/2013 | Jacquemard |
| 2014/0054810 A1 | 2/2014 | Cho |
| 2015/0354936 A1* | 12/2015 | Thomas .................. G01B 5/28 73/105 |
| 2019/0092698 A1 | 3/2019 | Kirkpatrick |
| 2020/0200227 A1* | 6/2020 | Linck .................... F16D 69/023 |
| 2021/0362368 A1 | 11/2021 | Diss |
| 2023/0150884 A1 | 5/2023 | Khan |

FOREIGN PATENT DOCUMENTS

| | | | |
|---|---|---|---|
| CN | 109384470 | 6/2021 | |
| CN | 113045324 | 6/2021 | |
| CN | 110937910 | 9/2021 | |
| CN | 115385711 | 11/2022 | |
| CN | 113277869 | 3/2023 | |
| CN | 115773321 | 3/2023 | |
| EP | 1845075 A1 * | 10/2007 | ............ C04B 35/64 |
| EP | 3248957 | 11/2017 | |
| EP | 3459923 | 3/2019 | |
| EP | 3805187 | 4/2021 | |
| EP | 4180408 | 5/2023 | |
| EP | 4223725 | 8/2023 | |
| FR | 2967170 | 5/2012 | |
| GB | 2485673 | 5/2012 | |
| JP | 5051286 | 3/1993 | |
| JP | 07043930 | 3/2022 | |
| WO | 2008075055 | 6/2008 | |
| WO | 2009127517 | 10/2009 | |

OTHER PUBLICATIONS

European Patent Office, European Search Report dated Feb. 19, 2025 in Application No. 242030484.

European Patent Office, European Search Report dated Feb. 25, 2025 in Application No. 242050847.

European Patent Office, Partial European Search Report dated Mar. 13, 2025 in Application No. 24202523.7.

USPTO; Requirement for Restriction/ Election dated Apr. 14, 2025 in U.S. Appl. No. 18/483,429.

European Patent Office, European Search Report dated Jun. 5, 2025 in Application No. 24202523.7.

USPTO; Non-Final Office Action dated Aug. 21, 2025 in U.S. Appl. No. 18/474,607.

USPTO; Non-Final Office Action dated Sep. 4, 2025 in U.S. Appl. No. 18/483,367.

European Patent Office, European Search Report dated Jun. 12, 2025 in Application No. 24202053.5.

USPTO; Non-Final Office Action dated Jul. 18, 2025 in U.S. Appl. No. 18/483,429.

USPTO; Non-Final Office Action dated Nov. 4, 2025 in U.S. Appl. No. 18/483,429.

USPTO; Notice of Allowance dated Dec. 17, 2025 in U.S. Appl. No. 18/474,607.

* cited by examiner

CERAMIC PARTICULATE COATING FOR WEAR IMPROVEMENT

FIELD

The present disclosure relates generally to aircraft braking systems and, more specifically, to ceramic particulate coatings for wear improvement of the aircraft braking system.

BACKGROUND

Aircraft typically utilize brake systems on wheels to slow or stop the aircraft during landings, taxiing, and rejected takeoffs. The brake systems generally employ a brake stack or heat sink comprising a series of friction disks that may be forced into sliding contact with one another during brake actuation to slow or stop the aircraft. The brake stack typically comprises rotor disks and stator disks that, in response to axial compressive loads, convert the kinetic energy of the aircraft into heat through frictional forces experienced between the friction disks.

SUMMARY

A method for decreasing a wear rate of a brake stack or a heat sink wear rate and increasing a brake life of the brake stack or the heat sink is disclosed. The method includes coating a wear surface of a brake disk with at least one of an engineered ceramic material or ceramic solution and installing the coated brake disk in a multi-disk brake system.

In various embodiments, the brake disk is a ceramic matrix composite (CMC) core with wear liners affixed to either side of the CMC core. In various embodiments, the engineered ceramic material is applied to a wear surface of the wear liners. In various embodiments, the engineered ceramic material is applied using at least one of plasma spraying, electron beam physical vapor deposition. In various embodiments, the wear liners are formed using the engineered ceramic material via net-shape pressing and densifying via pressured or pressureless sintering to form wear liners comprised entirely of the engineered ceramic material that are then mechanically affixed to either side of the CMC core.

In various embodiments, the brake disk is a ceramic matrix composite (CMC) core. In various embodiments, the engineered ceramic material is applied to a wear surface of the CMC core. In various embodiments, the engineered ceramic material is applied using at least one of plasma spraying, electron beam physical vapor deposition, or physical vapor deposition technique.

In various embodiments, the engineered ceramic material is at least one of silicon nitride ($Si_3N_4$), partially stabilized zirconium oxides ($ZrO_2$), or aluminum oxide ($Al_2O_3$). In various embodiments, the brake disk is coated with the engineered ceramic material and the ceramic solution thereby forming the coated brake disk.

In various embodiments, the brake disk is a carbon/carbon (C/C) disk and wherein the ceramic solution is applied to a wear surface of the C/C disk via at least one of spraying, painting, smearing, brushing, sorption, cold spraying, sputtering, pouring, sprinkling, or peptization, among others. In various embodiments, the ceramic solution comprises at least one of nano ceramic binary oxide particulates, doped nano ceramic binary oxide particulates, or nano ceramic ternary oxide particulates. In various embodiments, the nano ceramic binary oxide particulates comprise at least one of zirconium oxide ($ZrO_2$), aluminum oxide ($Al_2O_3$), or magnesium oxide (MgO). In various embodiments, the nano ceramic binary oxide particulates comprise at least one of lithium oxide ($Li_2O$), beryllium oxide (BeO), calcium oxide (CaO), strontium oxide (SrO), or barium oxide (BaO). In various embodiments, the nano ceramic binary oxide particulates comprise at least one of scandium(III) oxide ($Sc_2O_3$), yttrium oxide ($Y_2O_3$), cobalt(II) oxide (CoO), or nickel oxide (NiO). In various embodiments, the nano ceramic binary oxide particulates comprise at least one of silicon oxide ($SiO_2$), titanium oxide ($TiO_2$), or hafnium(IV) oxide ($HfO_2$). In various embodiments, the nano ceramic binary oxide particulates comprise at least one of vanadium (II) oxide (VO), vanadium(III) oxide ($V_2O_3$), vanadium oxide ($VO_2$), niobium(II) oxide (NbO), tantalum oxide ($Ta_2O_5$), tungsten(IV) oxide ($WO_2$), or tungsten trioxide ($WO_3$). In various embodiments, the nano ceramic binary oxide particulates comprise at least one of gallium oxide (GaO), indium oxide ($In_2O_3$), or tin(IV) oxide ($SnO_2$). In various embodiments, the nano ceramic binary oxide particulates comprise at least one of lanthanum oxide ($La_2O_3$), cerium dioxide ($CeO_2$), praseodymium(III,IV) oxide ($Pr_6O_{11}$), or neodymium oxide ($Nd_2O_3$). In various embodiments, the nano ceramic binary oxide particulates comprise at least one of samarium oxide ($Sm_2O_3$), europium oxide ($Eu_2O_3$), gadolinium oxide ($Gd_2O_3$), terbium oxide ($Tb_2O_3$), or dysprosium oxide ($Dy_2O_3$). In various embodiments, the nano ceramic binary oxide particulates comprise at least one of holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$). In various embodiments, the doped nano ceramic binary oxide particulates comprise at least one of yttrium oxide stabilized zirconium(IV) oxide (YSZ) or zirconium (IV) oxide toughened aluminum oxide (ZTA). In various embodiments, the nano ceramic ternary oxide particulates comprise at least one of lithium silicate ($Li_2SiO_3$), mullite ($Si_2Al_6O_{13}$), calcium silicate ($Ca_2SiO_4$), or hafnium orthosilicate ($HfSiO_4$). In various embodiments, the nano ceramic ternary oxide particulates comprise at least one of lithium titanate ($Li_2TiO_3$), aluminum titanate ($Al_2TiO_5$), calcium titanate ($CaTiO_3$), strontium titanate ($SrTiO_3$), barium titanate ($BaTiO_3$), or hafnium titanate ($HfTiO_4$). In various embodiments, the nano ceramic ternary oxide particulates comprise at least one of strontium zirconate ($SrZrO_3$) or barium zirconate ($BaZrO_3$).

The present disclosure may include any one or more of the individual features disclosed above and/or below alone or in any combination thereof. The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option. Further, any steps in a method discussed herein may be performed in any suitable order or combination.

Carbon/carbon (C/C) composites and silicon carbide (SiC) based ceramic matrix composites (CMCs) have found use in the aerospace and other industries for fabricating brake stacks and heat sinks. These brake stacks or heat sinks may utilize a core-liner concept (CMC core, C/C disk). By itself, carbon provides good wear resistance, but only 50-60% of the core-liner will be used before being discarded. Although less of the total disk will need to be replaced, 40-50% of the manufactured carbon may be wasted in the current core-liner setup. In core-liners where a CMC core is utilized, the CMC is not currently designed to function as a wearing material itself and instead provides thermal management in the brake stack or heat sink. This creates the need for wear liners or wear coatings/layers on the CMC to prevent degradation of the CMC core. Wear liners function as a source which develops beneficial wear debris that lubricates the brake stack or heat sink during operation while wear coatings/layers provides a wear-resistant material which can be ground away and replaced with new coatings as needed.

Provided herein, according to various embodiments, are manufacturing system(s) and method(s) for decreasing brake stack or heat sink wear rate and thus, increasing brake stack or heat sink brake life. In various embodiments, a brake disk is received. In various embodiments, the brake disk may be a CMC core with affixed wear liners, a CMC core by itself, or a C/C disk. In various embodiments, where the brake disk is a CMC core with wear liners coupled to either side of the CMC core, an engineered ceramic material may be formed, adhered, or mechanically attached, onto a wear surface of the wear liners themselves to function as a wear material that wears instead of the carbon of the wear liners itself. In various embodiments, a thickness of the CMC core may be varied to provide for overcoming the decrease in thermal conductivity caused by placing the engineered ceramic material at the wear interfaces while introducing a more durable wearing material.

In various embodiments, where the brake disk is a CMC core, in order for the CMC core to be utilized as a wear surface, wear surfaces of the CMC core may be coated with an engineered ceramic material to function as a wear material that wears instead of the CMC core itself. In various embodiments, a thickness of the CMC core may be varied to provide for overcoming the decrease in thermal conductivity caused by placing the engineered ceramic material at the CMC core wear interfaces while introducing a more durable wearing material.

In various embodiments, where the brake disk is a C/C disk, a surface of a finished C/C disk may be modified with nano ceramic binary oxide, doped nano ceramic binary oxide, or nano ceramic ternary oxide particulates which is suspended in a ceramic solution known as a "sol." In various embodiments, the sol may be applied via numerous routes like spraying, painting, smearing, brushing, sorption, cold spraying, sputtering, pouring, sprinkling, or peptization, among others, but is generally applied in small quantities at the disk surfaces like a surface coating. In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, when other carbon wear debris oxidizes away, the already oxidized ceramics remain without needing to be regenerated like current carbon wear debris and may regenerate carbon wear debris quickly to assist in brake lubrication.

In various embodiments, where wear surfaces of the wear liners are coated with the engineered ceramic material or where wear surfaces of the CMC core are coated with the engineered ceramic material, the engineered ceramic material coated wear liners or the engineered ceramic material coated CMC core may further be modified with a ceramic solution with nano ceramic binary oxide, doped nano ceramic binary oxide, or nano ceramic ternary oxide particulates suspended therein. In various embodiments, this modification provides for managing friction between another coated wear surface or even against an uncoated wear surface. In that regard, in various embodiments, wear surfaces of a wear liner affixed to a CMC core that have an engineered ceramic material adhered thereto may further be modified with a ceramic solution in order to manage friction in response to the engineered ceramic material and ceramic solution coated wear liner surface wearing against a surface of a coated CMC core, a coated wear liner affixed to a CMC core, or a coated C/C disk. In various embodiments, wear surfaces of a CMC core with an engineered ceramic material adhered to the wear surfaces may further be modified with a ceramic solution in order to manage friction in response to the engineered ceramic material and ceramic solution coated wear surface wearing against a surface of a coated CMC core, a coated wear liner affixed to a CMC core, or a coated C/C disk. In various embodiments, wear surfaces of wear liners affixed to a CMC core that have an engineered ceramic material adhered thereto may further be modified with a ceramic solution in order to manage friction in response to the engineered ceramic material and ceramic solution coated wear liner surface wearing against a carbon surface of an uncoated CMC core, a carbon surface of an uncoated wear liner affixed to a CMC core, or a carbon surface of an uncoated C/C disk. In various embodiments, wear surfaces of a CMC core with an engineered ceramic material adhered to the wear surfaces may further be modified with a ceramic solution in order to manage friction in response to the engineered ceramic material and ceramic solution coated wear surface wearing against a carbon surface of an uncoated CMC core, a carbon surface of an uncoated wear liner affixed to a CMC core, or a carbon surface of an uncoated C/C disk.

Figure 1:
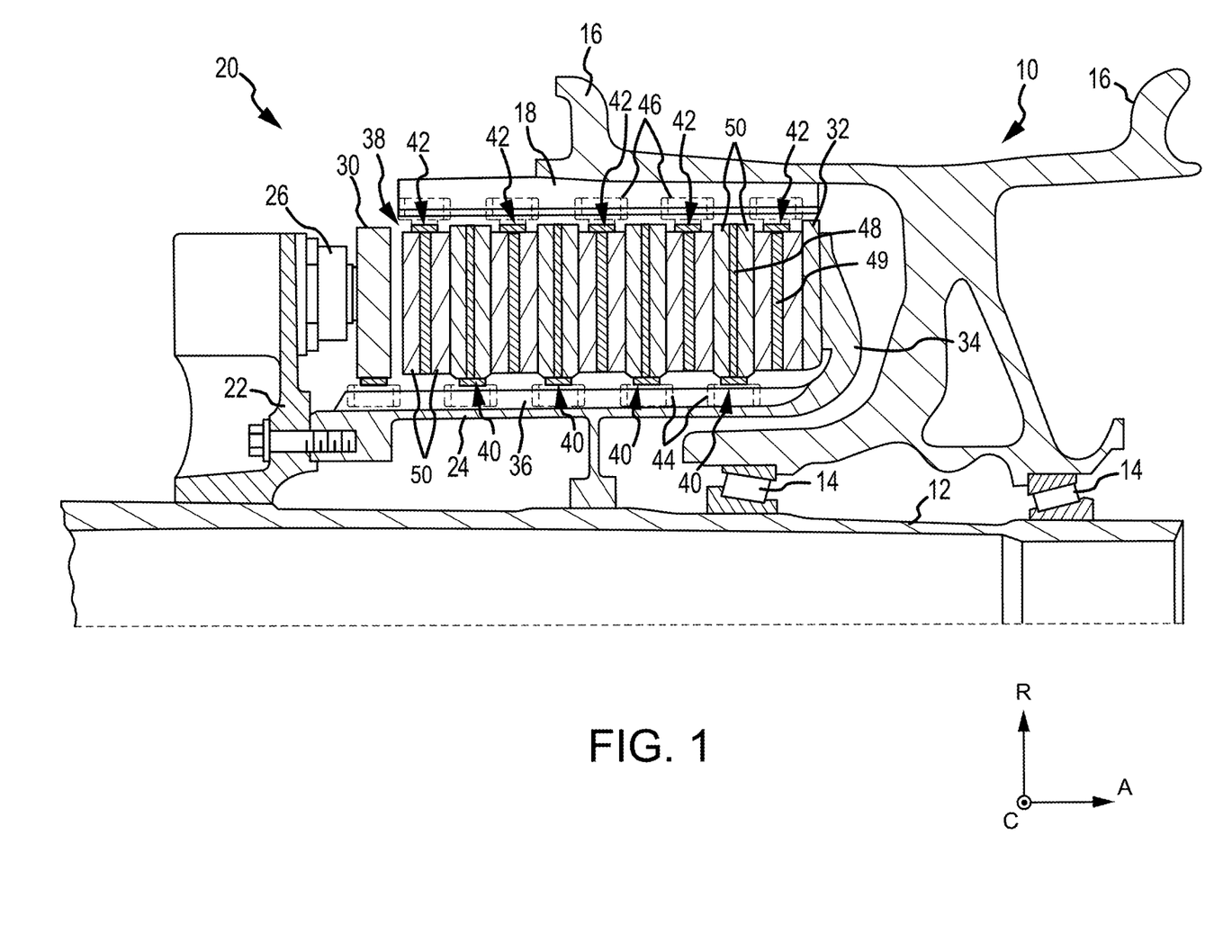
FIG. 1 illustrates a multi-disk brake system, in accordance with various embodiments.

Referring to FIG. 1, a multi-disk brake system 20 is illustrated according to various embodiments. The system may include a wheel 10 supported for rotation around axle 12 by bearings 14. Axle 12 defines an axis of multi-disk brake system 20 and the various components thereof. Any reference to the terms axis and axial may include an axis of rotation defined by axle 12 or a dimension parallel to such axis. Wheel 10 includes rims 16 for supporting a tire, and a series of axially extending rotor splines 18 (one shown). Rotation of wheel 10 is modulated by multi-disk brake system 20. Multi-disk brake system 20 includes torque flange 22, torque tube 24, a plurality of pistons 26 (one shown), pressure plate 30, and end plate 32. Torque tube 24 may be an elongated annular structure that includes reaction plate 34 and a series of axially extending stator splines 36 (one shown). Reaction plate 34 and stator splines 36 may be integral with torque tube 24, as shown in FIG. 1, or attached as separate components.

Multi-disk brake system 20 also includes a plurality of friction disks 38. The plurality of friction disks 38 includes at least one non-rotatable friction disk (stator) 40, and at least one rotatable friction disk (rotor) 42. Stators 40 may include a carbon/carbon (C/C) disk or ceramic matrix composite (CMC) (stator core) 48. Stators 40 may also include wear liners 50 located over opposing sides of a CMC core 48. Rotors 42 may include a carbon/carbon (C/C) disk or ceramic matrix composite (CMC) (rotor core) 49. Rotors 42 may also include wear liners 50 located over opposing sides of a CMC core 49. Each friction disk 38 includes an attachment structure. For example, stators 40 include a plurality of stator lugs 44 at circumferentially spaced positions around an inner circumference of stators 40, and rotors 42 include a plurality of rotor lugs 46 at circumferentially spaced positions around an outer circumference of rotors 42.

In various embodiments, pressure plate 30, end plate 32, wear liners 50, stator core 48, and rotor core 49 are each annular structures made at least partially from a carbon composite material. In various embodiments, friction disk cores 48, 49 and wear liners 50 may comprise different materials. For example, friction disk cores 48, 49 may comprise a first material, for example, C/C or CMC, and wear liners 50 may comprise a second material, for example, a carbon composite material. In various embodiments, friction disk cores 48, 49 and wear liners 50 may comprise the same material. For example, friction disk cores 48, 49 and wear liners 50 may both comprise a carbon composite material. The material of friction disk cores 48, 49 may be selected for its structural properties, thermal conductivity, heat capacity, and/or oxidation resistance properties, and the material of wear liners 50 may be selected for its wear resistance and/or frictional properties. Thus, friction disks 38 may experience the structural advantages of friction disk cores 48, 49 and the frictional advantages of wear liners 50.

Torque flange 22 is mounted to axle 12. Torque tube 24 is bolted to torque flange 22 such that reaction plate 34 is near an axial center of wheel 10. End plate 32 is connected to a surface of reaction plate 34 facing axially away from the axial center of wheel 10. Thus, end plate 32 is non-rotatable by virtue of its connection to torque tube 24. Stator splines 36 may support the pressure plate 30 such that pressure plate 30 is also non-rotatable. Stator splines 36 also support the stators 40. Stators 40 engage stator splines 36 with gaps formed between stator lugs 44. Similarly, rotors 42 engage rotor splines 18 with gaps formed between rotor lugs 46. Thus, rotors 42 are rotatable by virtue of their engagement with rotor splines 18 of wheel 10.

In various embodiments, rotors 42 are arranged with end plate 32 on one end, pressure plate 30 on the other end, and stators 40 interleaved such that rotors 42 are adjacent to non-rotatable friction components. Pistons 26 are connected to torque flange 22 at circumferentially spaced positions around torque flange 22. Pistons 26 face axially toward wheel 10 and contact a side of pressure plate 30 opposite rotors 42. Pistons 26 may be powered electrically, hydraulically, or pneumatically. In response to actuation of pistons 26, a force towards reaction plate 34 is exerted on friction disks 38 such that rotors 42 and stators 40 are pressed together between pressure plate 30 and end plate 32.

Figure 2A:
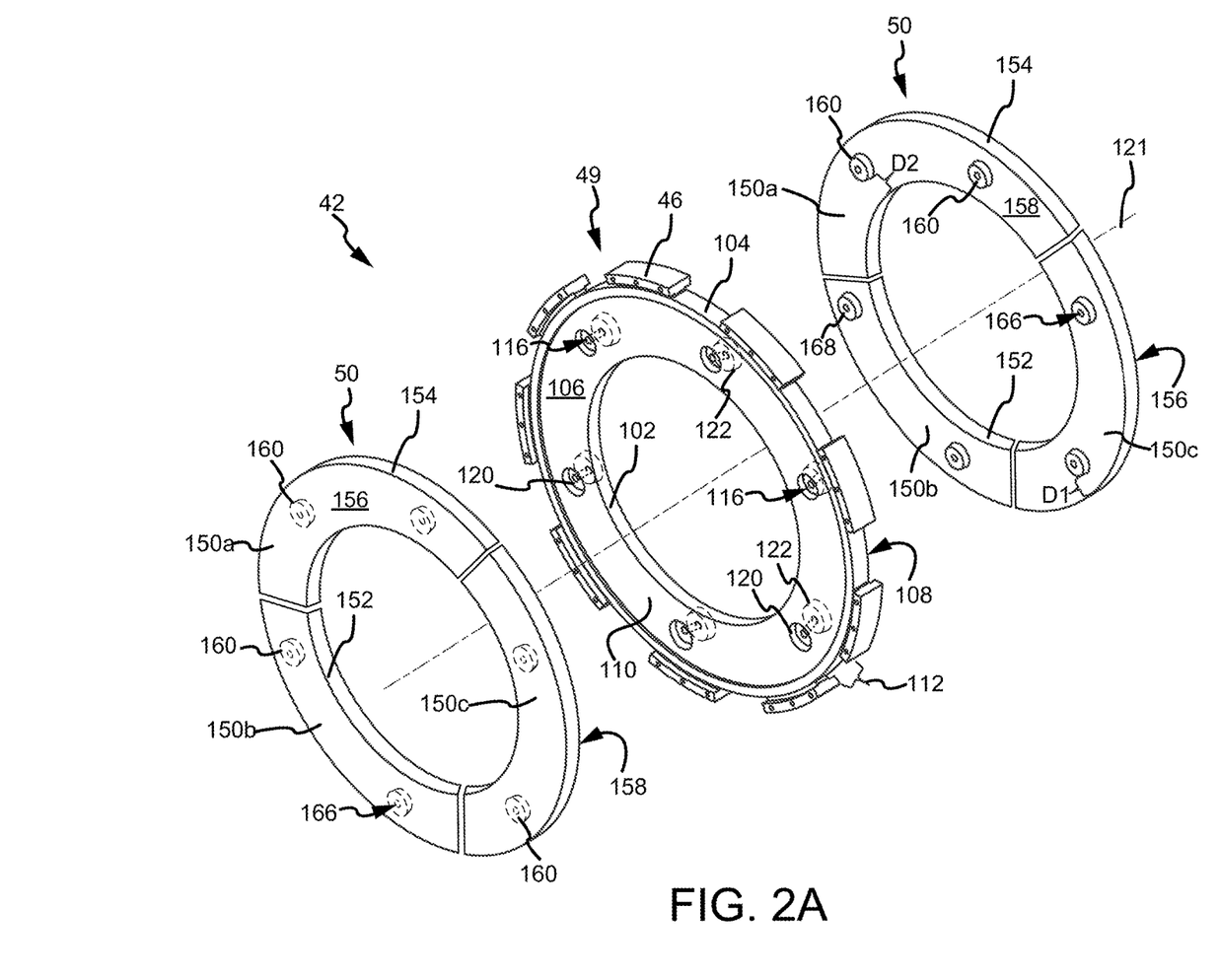
FIG. 2A illustrates an exploded view of a rotor having a wear liner with integrated torque buttons, in accordance with various embodiments.

Referring to FIG. 2A, an exploded view of a rotor 42 having a wear liner with integrated torque buttons is illustrated, according to various embodiments. While FIG. 2A illustrates a wear liner with torque buttons, the various embodiments are not limited to this embodiment. In that regard, in various embodiments, integrated torque slots may be utilized to attach the wear liners to a rotor 42 or stator 40 CMC core. Rotor 42 may comprise rotor core 49 and two wear liners 50 located over opposing surfaces of rotor core 49. Wear liners 50 may be segmented such that each wear liner 50 comprises a plurality of wear liner segments (e.g., first wear liner segment 150a, second wear liner segment 150b, and third wear liner segment 150c). Wear liner segments 150a, 150b, and 150c are located circumferentially adjacent one another over surfaces 106 and 108 of rotor core 49. Wear liner segments 150a, 150b, and 150c may jointly form a generally annular or ring-shaped structure (i.e., wear liner 50). Stated differently, wear liner 50 may be constructed from multiple arcuate segments that jointly extend substantially 360 degrees around an axis 121. As used herein, "substantially 360 degrees" means within 5 degrees of 360 degrees. In this regard, in various embodiments, wear liner segments 150a, 150b, and 150c may be coupled to rotor core 49 with a small gap or space between adjacent segments to allow for thermal expansion of wear liner segments 150a, 150b, and 150c and/or rotor core 49. For example, in various embodiments, at temperatures equal to or below 75.0° F. (23.9° C.), wear liners segments 150a, 150b, and 150c may be spaced between 0.001 inches (0.00254 centimeter) and 0.02 inches (0.0508 centimeter) apart (i.e., between 0.0025 cm (0.0009843 inch) and 0.051 cm (0.02008 inch) apart). In various embodiments, wear liner segments 150a, 150b, and 150c may be in contact with one another at room temperatures. For example, in various embodiments, wear liner segments 150*a*. 150*b*, and 150*c* may be in contact with one another at temperatures equal to or below 75.0° F. (23.9° C.).

While wear liners 50 are shown including three wear liner segments (i.e., 150*a*, 150*b*, and 150*c*), it should be understood that wear liners 50 as disclosed herein may be a single segment or may comprise any number of wear liner segments. In various embodiments, wear liners 50 may each comprise between one wear liner segments and eight wear liner segments. In various embodiments, wear liners 50 may each comprise between three wear liner segments and six wear liner segments. The wear liner segments may be approximately equal in inner and outer circumferential length. As used herein, "approximately equal" means±3.0% of the wear liner segment total outer circumferential length of the wear liner.

Wear liners 50, including wear liner segments 150*a*. 150*b*, and 150*c*, comprise an inner circumferential surface 152 and an outer circumferential surface 154. Wear liners 50, including wear liner segments 150*a*, 150*b*, and 150*c*, further comprise a wear surface 156 and a non-wear surface 158 opposite wear surface 156. Wear surface 156 extends from inner circumferential surface 152 to outer circumferential surface 154 and is oriented away from rotor core 49. Non-wear surface 158 extends from inner circumferential surface 152 to outer circumferential surface 154 and is oriented toward rotor core 49. In various embodiments, wear liner segments 150*a*, 150*b*, and 150*c* each include at least one torque button (protrusion) 160. Protrusions 160 may extend (i.e., protrude) from non-wear surface 158 in an axial direction toward rotor core 49. Protrusions 160 may comprise a generally cylindrical or frustoconical shape.

Protrusions 160 may be located a distance D1 from outer circumferential surface 154 and a distance D2 from inner circumferential surface 152. In various embodiments, distance D1 may be about equal to distance D2. As used herein "about equal" means±0.05 inches (±0.127 cm). In various embodiments, distance D1 may be greater than distance D2. In various embodiments, distance D2 may be greater than distance D1. The location and configuration of protrusions 160 may be selected to minimize vibration.

Rotor core 49 may comprise a rotor spine 110 and rotor lugs 46. Rotor core 49 may engage rotor splines 18 (FIG. 1) in rotor gaps 112 formed between rotor lugs 46. In this regard, rotor 42 may be rotatable by virtue of the engagement between rotor lugs 46 and rotor splines 18 of wheel 10 (FIG. 1). Rotor core 49 further comprises a first surface 106 and a second surface 108 opposite first surface 106. First surface 106 and second surface 108 may extend along rotor spine 110 between an inner circumferential surface 102 and outer circumferential surface 104 of rotor core 49. A plurality of first depressions 120 may be formed in, and defined by, first surface 106. A plurality of second depressions 122 may be formed in, and defined by, second surface 108. First depressions 120 may be axially aligned with second depressions 122. First depressions 120 and second depressions 122 may each be formed partially through rotor core 49 such that a portion of rotor core 49 remains between a bottom, or axially inward, surface of first depressions 120 and a bottom, or axially inward, surface of second depressions 122.

First depressions 120 and second depressions 122 may comprise a generally cylindrical or frustoconical shape. The shape of first depressions 120 and second depressions 122 may complement the shape of protrusions 160.

An opening 166 may be formed through protrusions 160. Openings 166 may extend completely through wear liners 50 such that openings 166 extend from wear surface 156 to a surface 168 of protrusion 160 opposite wear surface 156.

An opening 116 may be formed through first depressions 120 and second depressions 122. Openings 116 may extend completely through rotor core 49. With momentary reference to FIG. 2C, openings 116 may extend from the bottom, or axially inward, surface 130 of first depressions 120 to the bottom, or axially inward, surface 132 of second depressions 122. Openings 116 may be aligned with openings 166 and may be configured to receive a fastener for securing wear liners 50 to rotor core 49.

Figure 2B:
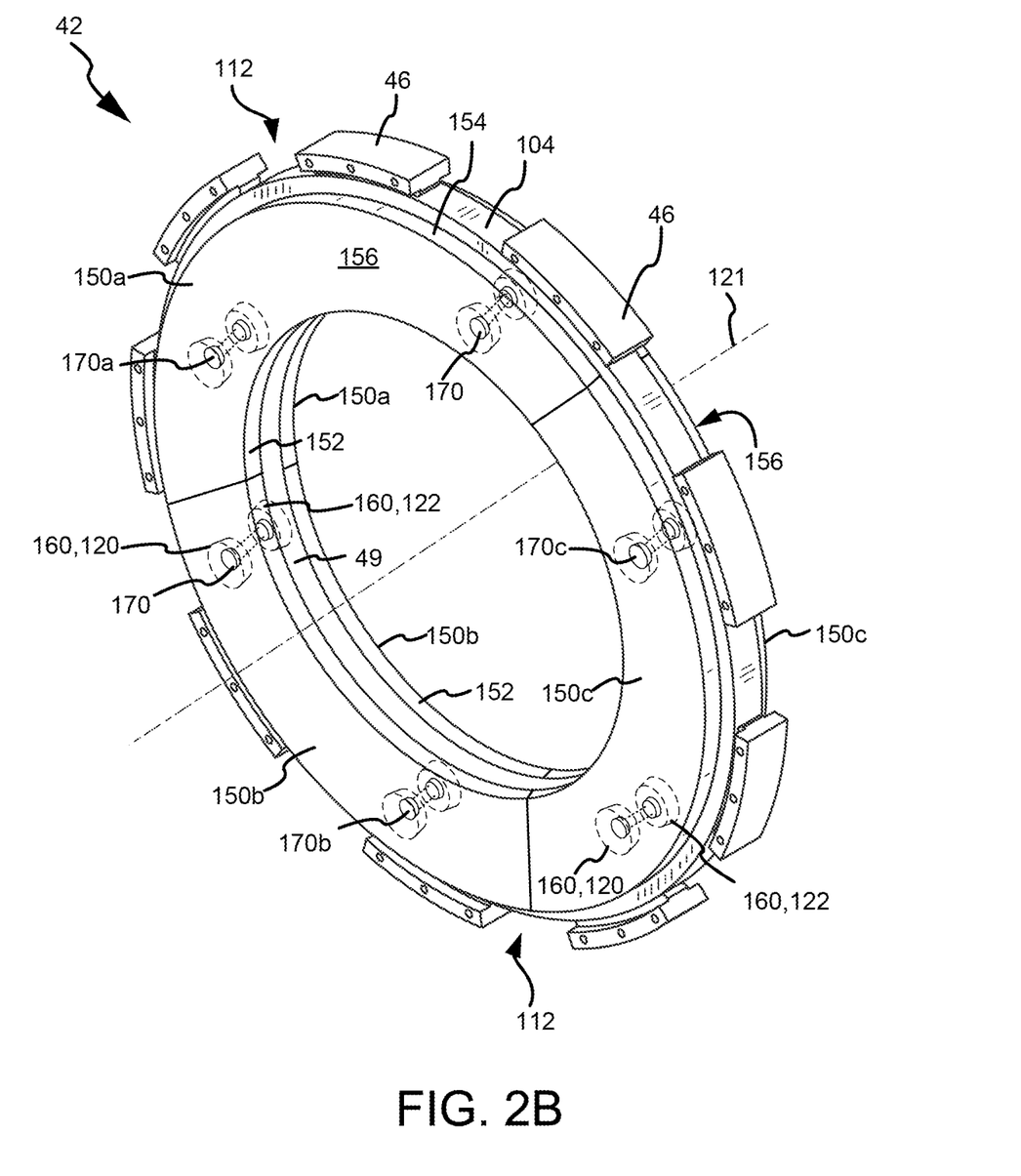
FIG. 2B illustrates an assembled rotor, in accordance with various embodiments.

Referring to FIG. 2B, an assembled rotor 42 is illustrated. With combined reference to FIG. 2A and FIG. 2B, protrusions 160 may be located and/or positioned within first depressions 120 and second depressions 122. In this regard, the protrusions 160 adjacent to first surface 106 of rotor core 49 may be positioned within first depressions 120, and the protrusions 160 adjacent to second surface 108 of rotor core 49 may be positioned with second depressions 122. Fasteners 170 may couple or otherwise secure wear liners 50 to rotor core 49. Fasteners 170 may comprise a rivet, bolt, pin, screw, or other suitable securement mechanism. Fasteners 170 may be located through protrusions 160. Fasteners 170 extend between opposing wear liner segments. For example, fastener 170*a* extends between opposing wear liner segments 150*a*. Fastener 170*b* extends between opposing wear liner segments 150*b*. Fastener 170*c* extends between opposing wear liner segments 150*c*. In this regard, fasteners 170 may couple wear liner segments 150*a*, 150*b*, and 150*c* to rotor core 49.

Figure 2C:
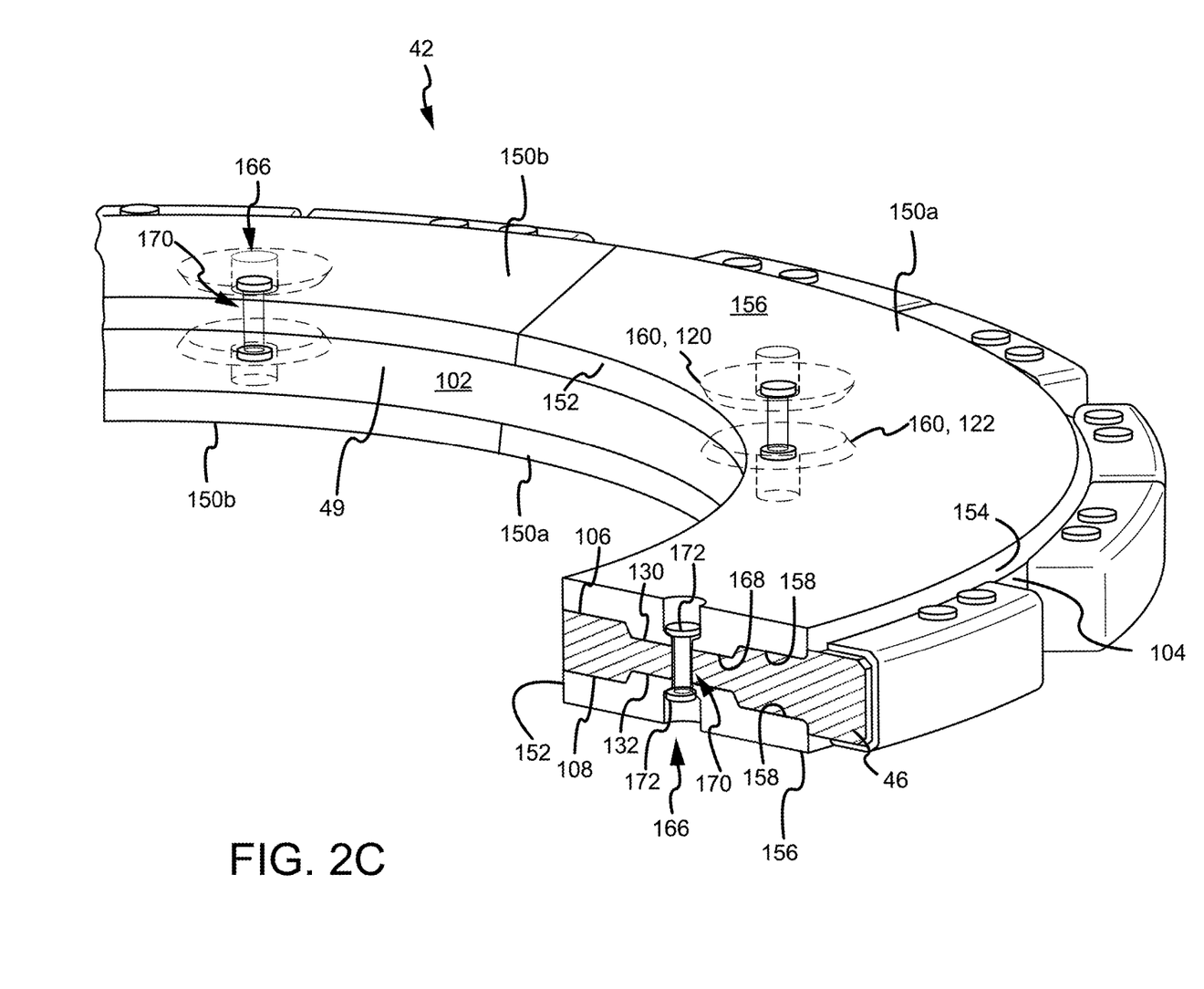
FIG. 2C illustrates a cutaway view of an assembled rotor, in accordance with various embodiments.

Referring to FIG. 2C, a cutaway view of assembled rotor 42 is illustrated, according to various embodiments. Openings 166 may include a counterbore configured to receive fastener 170. Heads 172 of fasteners 170 may be recessed with respect to wear surface 156. Locating fasteners 170 through protrusion 160 may allow the heads 172 of fasteners 170 to be located a greater distance from wear surface 156. In various embodiments, after wear liners 50 have been fully worn (i.e., after wear liners 50 have been worn below a suitable operational thickness), heads 172 of fasteners 170 may remain recessed with respect to wear surface 156.

Figure 3:
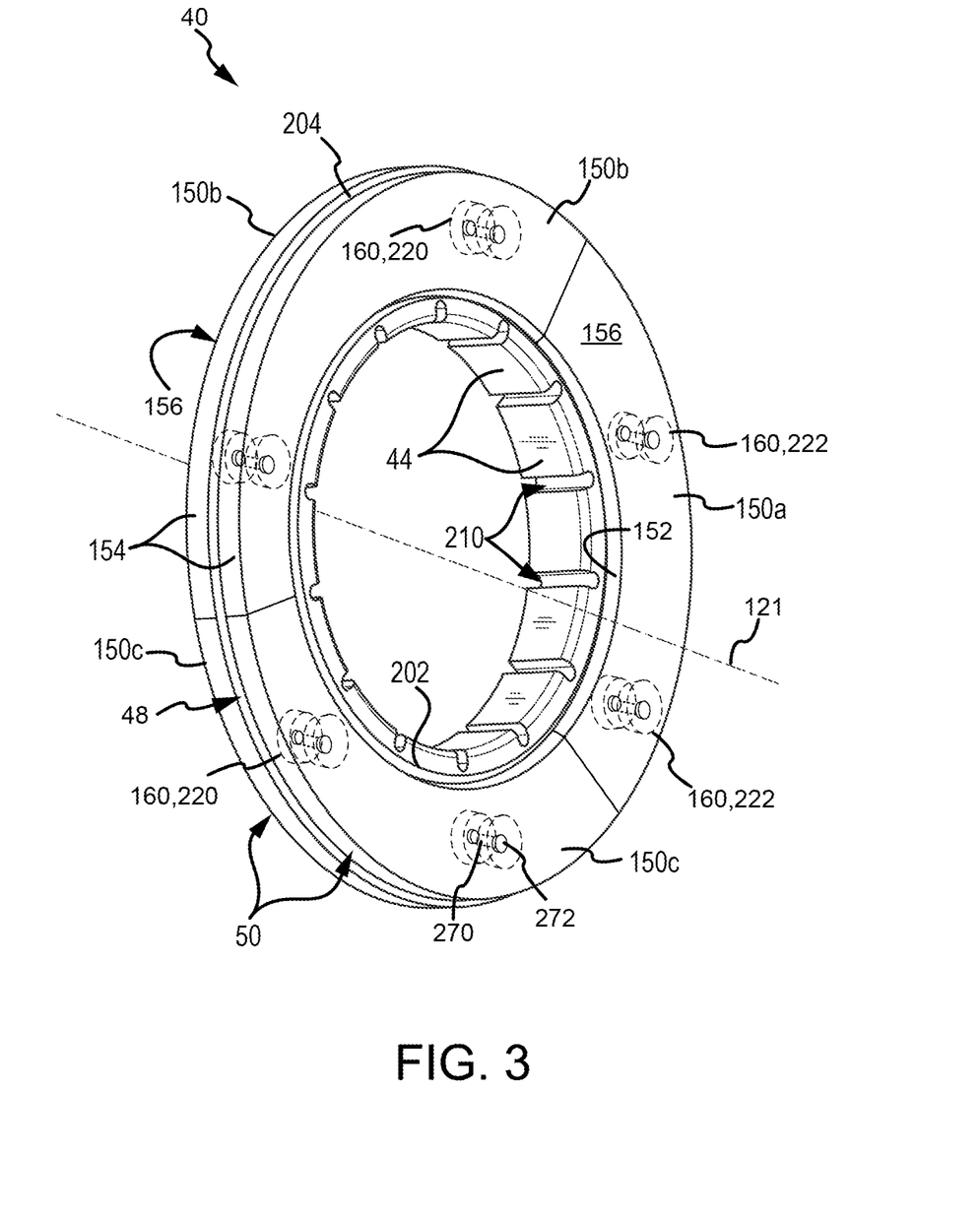
FIG. 3 illustrates an assembled stator comprising wear liner segments having integrated torque buttons, in accordance with various embodiments is illustrated.

Referring to FIG. 3, an assembled stator 40 comprising wear liner segments having integrated torque buttons is illustrated, according to various embodiments. Stator 40 may comprise a stator core 48 and wear liners 50. While FIG. 3 illustrates a wear liner with torque buttons, the various embodiments are not limited to this embodiments. In that regard, in various embodiments, integrated torque slots may be utilized to attach the wear liners to a rotor 42 or stator 40 CMC core. Stator core 48 may comprise stator lugs 44. Stator lugs 44 may be located along an inner circumferential surface 202. Stator gaps 210 may be located between stator lugs 44. Stator gaps 210 may be positioned to align with stator splines 36 (FIG. 1). The engagement between the stator splines 36 and stator lugs 44 may prevent stator core 48 from rotating in response to a torque being applied to stator 40 during braking. Stator core 48 may include opposing first and second surfaces extending between inner circumferential surface 202 and an outer circumferential surface 204.

A plurality of first depressions 220 may be formed in the first surface of stator core 48. A plurality of second depressions 222 may be formed in the second surface of stator core 48. First depressions 220 may axially aligned with second depressions 222. First depressions 220 and second depressions 222 may each be formed partially through stator core 48 such that a portion of stator core 48 remains between a bottom, or axially inward, surface of first depressions 220 and a bottom, or axially inward, surface of second depressions 222. Protrusions 160 may be located and/or positioned in first depressions 220 and second depressions 222.

Wear liners 50, including wear liner segments 150a, 150b, and 150c, may be coupled to stator core 48 with wear surface 156 oriented away from stator core 48 and protrusions 160 oriented toward stator core 48. Fasteners 270, similar to fasteners 170 in FIG. 2B, may be located through protrusion 160 and may couple wear liner segments 150a, 150b, and 150c to stator core 48.

In various embodiments, wear liner segments 150a, 150b, and 150c, may have an identical or substantially similar configuration. In this regard, the configuration of depressions 120, 122 in rotor core 49 may be identical or substantially similar to the configuration of depressions 220, 222 in stator core 48 such that wear liner segments 150a, 150b, and 150c may be compatible with both (i.e., interchangeable between) rotor core 49 and stator core 48.

During braking, the wear surface 156 of rotor 42 wear liners 50 may contact the wear surface 156 of stator 40 wear liners 50, which may create the friction necessary to decelerate the aircraft. In various embodiments, wear liners 50 may be replaceable, such that after wear liners 50 have been worn below a suitable operational thickness, wear liners 50 may be removed from rotor core 49 and/or stator core 48 and replaced with new or remanufactured wear liners 50. Wear liners 50 formed from a plurality of discrete segments tend to be less susceptible to warpage as compared to unibody wear liners of similar thickness. In this regard, wear liners 50 being segmented may allow a greater volume of wear liners 50 to be consumed (i.e. used, worn) prior to replacement.

Figure 4:
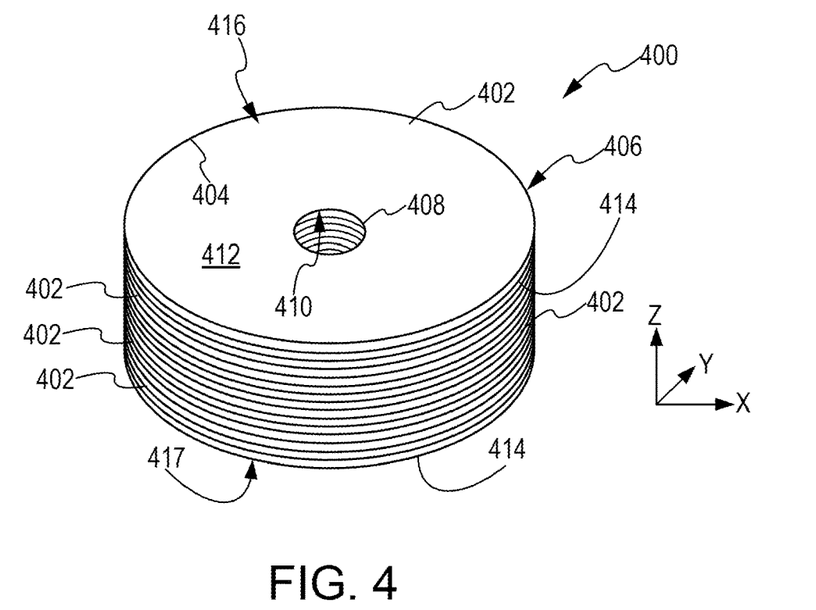
FIG. 4 illustrates a fibrous preform utilized to manufacture a carbon/carbon (C/C) disk, in accordance with various embodiments.

Referring now to FIG. 4, in accordance with various embodiments, a fibrous preform 400 utilized to manufacture a carbon/carbon (C/C) disk is illustrated. Fibrous preform 400 may be employed to form a stator 40 or a rotor 42, as described above. Fibrous preform 400 may comprise a porous structure comprised of a plurality of stacked textile layers 402. Each textile layer 402 having a thickness in a first dimension (i.e., the Z-direction) that may be substantially less than a thickness of the layer 402 in the other two dimensions (i.e., the X-direction and the Y-direction). As used herein, the "in-plane" direction refers to directions parallel to the thicker two dimensions (i.e., parallel to the X and Y directions and perpendicular to the Z-direction).

A porous structure may comprise any structure derived from a fibrous material such as carbon fibers or the like. In various embodiments, the carbon fibers may be derived from polyacrylonitrile (PAN), rayon (synthetic fiber derived from cellulose), oxidized polyacrylonitrile fiber (OPF), pitch, or the like. The starting fiber may be pre-oxidized PAN or fully carbonized commercial carbon fiber. Fibrous preform 400 may be prepared by needling the textile layers 402 of fibrous preform 400. Needling the textile layers 402 of fibrous preform 400 tends to push fibers from one layer 402 to the next layer 402, thereby forming z-fibers that extend axially across the layers 402. Needling pulls fibers from the in-plane direction and forces the fibers into the z-fiber direction. After needling, fibrous preform 400 may comprise fibers extending in three different directions: the radial direction, the circumferential direction, and the axial direction (or the X, Y, and Z directions).

Fibrous preform 400 may be fabricated using a net shape preforming technology or may be cut from a needled board. Fibrous preform 400 may be a lay-up of woven, braided or knitted textile layers 402. The fibrous material may be in the form of chopped carbon fibers molded to form layers 402. Prior to the densification process, the fibrous material may be formed into a preform having any desired shape or form. For example, the fibrous preform may be in the form of a disk having any shape such as, for example, a polygon, a cylinder, a triangle, annular, square, rectangle, pentagon, hexagon, octagon, or the like. In various embodiments, layers 402 and fibrous preform 400 may have a generally annular shape. In accordance with various embodiments, the outer circumferential (or outer perimeter) surfaces 404 of layers 402 may form an outer diameter (OD) 406 of fibrous preform 400, and the inner circumferential (or inner perimeter) surfaces 408 of layers 402 may form an inner diameter (ID) 410 of fibrous preform 400. Each layer 402 includes a first axial face 412 and a second axial face 414 opposite the first axial face 412. First and second axial faces 412, 414 extend from outer circumferential surface 404 to inner circumferential surface 408. Layers 402 are stacked such that the first axial face 412 of one layer 402 is oriented toward the second axial face 414 of the adjacent layer 402. First axial face 412 of the uppermost layer 402 forms the upper axial end 416 of fibrous preform 400 and the second axial face 414 of the bottommost layer 402 forms the lower axial end 417 of fibrous preform 400 (i.e., the two layers 402 that are farther apart from one another in the axial direction form the axial ends 416, 417 of the fibrous preform).

Figure 5:
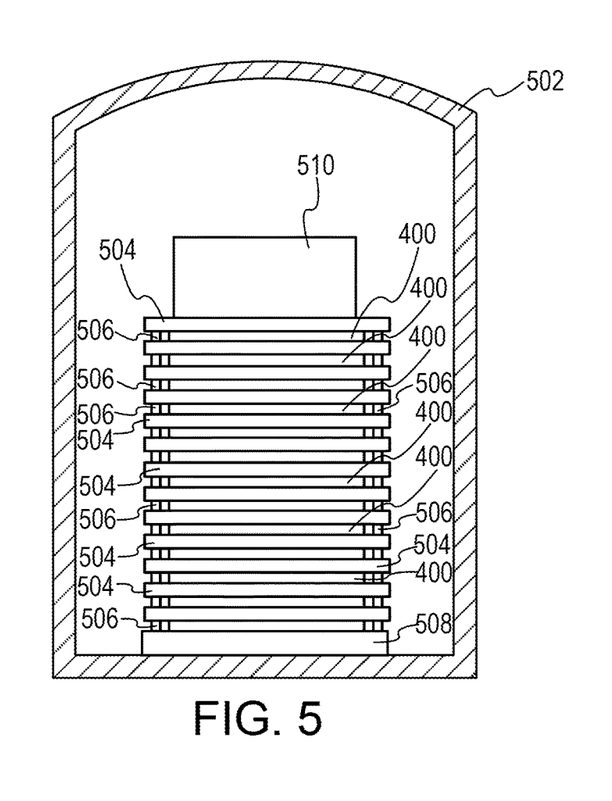
FIG. 5 illustrates a fibrous preform utilized to manufacture a carbon/carbon (C/C) disk in a carbonization furnace, in accordance with various embodiments.

As shown in FIG. 5, in accordance with various embodiments, fibrous preform 400 utilized to manufacture a carbon/carbon (C/C) disk being placed in a carbonization furnace 502 for carbonization is illustrated. The carbonization process may be employed to convert the fibers of the fibrous preforms 400 into pure carbon fibers, as used herein only "pure carbon fibers" means carbon fibers comprised of at least 99% carbon. The carbonization process is distinguished from the densification process described below in that the densification process involves infiltrating the pores of the fibrous preform 400 and depositing a matrix (e.g., carbon, phenolic resin, or any other desired matrix material) within and around the carbon fibers of the fibrous preform, and the carbonization process refers to the process of converting the fibers of the fibrous preform 400 into pure carbon fibers.

In various embodiments, a plurality of fibrous preforms 400 may be placed on top of one another with separator plates 504 and spacing stops 506 disposed between adjacent fibrous preforms 400. For example, the bottommost fibrous preform 400 may be placed on a base plate 508 at the bottom of carbonization furnace 502. A separator plate 504 may be placed on top of the bottommost fibrous preform 400. Another fibrous preform 400 may then be placed on the separator plate 504, and another separator plate 504 may be placed on that fibrous preform 400. A stack of fibrous preforms 400 and separator plates 504 may be constructed in this manner, with each fibrous preform 400 being separated from superjacent and subjacent fibrous preforms 400 by separator plates 504. Spacing stops 506 may be placed between each of the separator plates 504. The spacing stops 506 may comprise a height that is less than the thickness of the fibrous preform 400 prior to carbonization. Spacing stops 506 may define a target thickness of the fibrous preform 400 after carbonization. In that regard, after the stack of fibrous preforms 400 is constructed, and before the carbonization process has started, gaps may exist between the spacing stops 506 and adjacent separator plates 504. During carbonization, a compressive load may be applied to the fibrous preforms 400, thereby compressing the fibrous preforms 400 until spacing stops 506 contact adjacent separator plates 504.

In various embodiments, compressive pressure may be applied to fibrous preforms 400 during the carbonization.

The compressive pressure may be applied by placing a weight 510 over fibrous preforms 400, or by applying a compressive load to the fibrous preforms 400 by other suitable means. The compressive pressure may be applied along the direction of the z-fibers. It will be appreciated by those skilled in the art that the mass of weight 510 and/or the compressive force generated by weight 510 may vary depending on the size of fibrous preforms 400, the pre-carbonization fiber volume of fibrous preforms 400, the desired post-carbonization fiber volume of fibrous preforms 400, and/or the number fibrous preforms 400 being compressed. As used herein, "fiber volume" refers the percentage of the total volume of the fibrous preform that is formed by the fibers of the fibrous preform. For example, a fiber volume of 18% means the fibers of the fibrous preform form 18% of the total volume of fibrous preform. In various embodiments, after carbonization, fibrous preform 400 includes a fiber volume of between 10% and 50%. In various embodiments, after carbonization, fibrous preform 400 includes a fiber volume of between 15% and 25%. In various embodiments, fibrous preforms 400 having a low fiber volume may be desirable for the infiltration methods disclosed herein. In various embodiments, after carbonization, fibrous preform 400 may comprise a fiber volume of less than 25%. For example, in various embodiments, after carbonization, fibrous preform 400 may comprise a fiber volume of 21% or, in various embodiments, fibrous preform 400 may comprise a fiber volume of 18%. In various embodiments, the carbonized fibrous preform 400 is then densified via chemical vapor infiltration (CVI) with pyrolytic carbon at a predetermined temperature for a predetermined time interval as is known in the art, which results in a finished C/C disk or wear liner.

In various embodiment, a CMC core may be manufactured forming a fibrous preform, densifying the fibrous preform, and performing a silicon melt infiltration. In various embodiments, forming the fibrous preform include disposing a first textile layer on first plate, forming a first ceramic particle layer over a first textile layer disposing a second textile layer over the first ceramic particle layer, forming a second ceramic particle layer over the second textile layer, and disposing a third textile layer over the second ceramic particle layer. Once a desired number of textile layers and ceramic particle layers have been stacked, a second plate is located over the final textile layer. In various embodiments, a compressive load may be applied to the fibrous preform. In various embodiments, the compressive load may be applied during the densification.

In various embodiments, forming a first ceramic particle layer over a first textile layer includes locating a first shim around an outer perimeter of the first textile layer, depositing a boron carbide powder over the first textile layer, and removing any portion of the boron carbide powder that extends above an upper surface of the first shim. In various embodiments, forming a second ceramic particle layer over the second textile layer includes locating a second shim around an outer perimeter of the second textile layer, depositing a boron carbide powder over the second textile layer, and removing any portion of the boron carbide powder that extends above an upper surface of the second shim.

Figure 6:
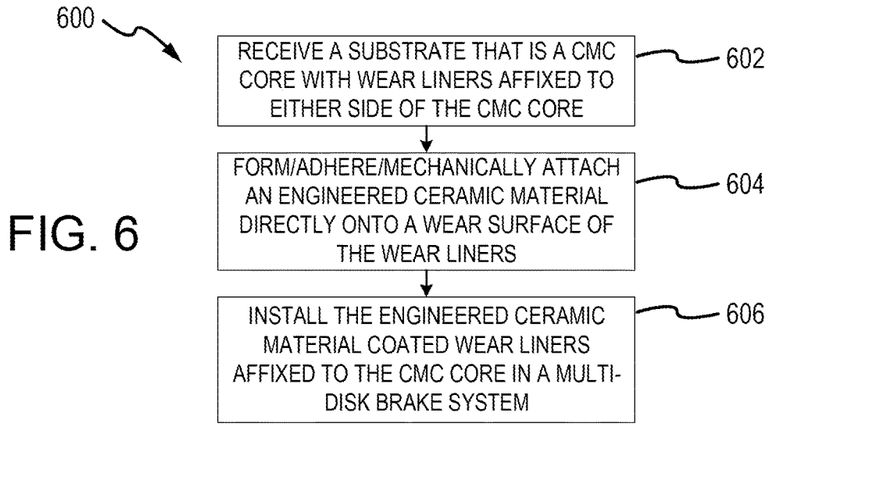
FIG. 6 illustrates a flowchart of a method for decreasing brake stack or heat sink wear rate of wear liners affixed to a CMC core and, thus, increasing brake stack or heat sink brake life of the wear liner, in accordance with various embodiments.

Referring now to FIG. 6, in accordance with various embodiments, a flowchart illustrating a method 600 for decreasing brake stack or heat sink wear rate of wear liners affixed to a CMC core and thus, increasing brake stack or heat sink brake life of the wear liner is illustrated. In various embodiments, at block 602, a brake disk that is a CMC core with wear liners affixed to either side of the CMC core is received. At block 604, an engineered ceramic material is formed, adhered, or mechanically attached, among others, onto a wear surface of the wear liners themselves to function as a wear material that wears instead of the carbon of the wear liners itself. In various embodiments, the engineered ceramic material may be formed, adhered, or mechanically attached, among others, to the wear liners using one of plasma spraying, electron beam physical vapor deposition (or similar physical vapor deposition technique) to build up a coating of the engineered ceramic material on the wear liner. In various embodiments, rather than coating an existing wear liner, a wear liner may be formed using engineered ceramic material by net-shape pressing and densifying via pressured or pressureless sintering techniques to form a wear liner comprised entirely of the engineered ceramic material which is mechanically attached to the CMC core. In various embodiments, the engineered ceramic material may be one or more of silicon nitride ($Si_3N_4$), partially stabilized zirconium oxides ($ZrO_2$), or aluminum oxide ($Al_2O_3$), and various combinations of the same, among others. In various embodiments, a thickness of the engineered ceramic material may be between 0.10 inches (0.254 centimeters) and 0.25 inches (0.635 centimeters) thick. In various embodiments, a thickness of the engineered ceramic material may be between 0.13 inches (0.3302 centimeters) and 0.22 inches (0.5588 centimeters) thick. In various embodiments, a thickness of the engineered ceramic material may be between 0.15 inches (0.381 centimeter) and 0.20 inches (0.508 centimeter) thick. In various embodiments, a thickness of the CMC core may be varied to provide for overcoming the decrease in thermal conductivity caused by placing the engineered ceramic material at the wear interfaces while introducing a more durable wearing material. In that regard, in various embodiments, the CMC core may be between 0.20 inches (0.508 centimeters) and 2 inches (5.08 centimeters) thick. In various embodiments, the CMC core may be between 0.23 inches (0.5842 centimeters) and 1.25 inches (3.175 centimeters) thick. In various embodiments, the CMC core may be between 0.25 inches (0.635 centimeters) and 0.750 inches (1.905 centimeters) thick. In various embodiments, at block 606, the engineered ceramic material coated wear liners affixed to the CMC core may then be installed in a multi-disk brake system, such as the multi-disk brake system 20 of FIG. 1.

Figure 7:
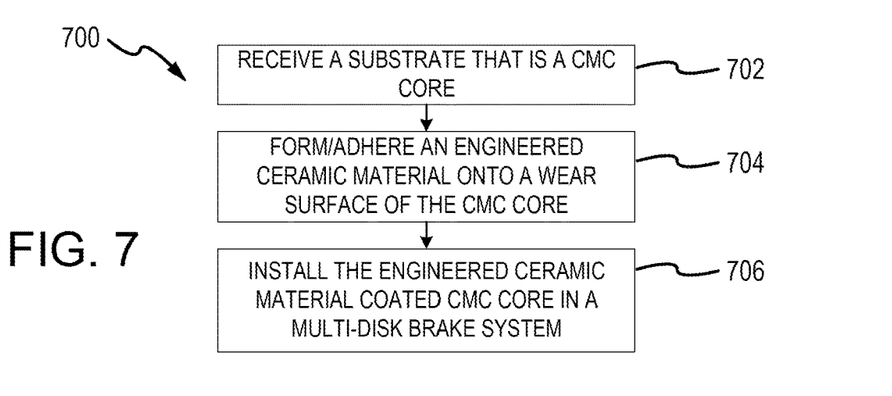
FIG. 7 illustrates a flowchart of a method for decreasing brake stack or heat sink wear rate of a CMC core and, thus, increasing brake stack or heat sink brake life of the CMC core, in accordance with various embodiments.

Referring now to FIG. 7, in accordance with various embodiments, a flowchart illustrating a method 700 for decreasing brake stack or heat sink wear rate of a CMC core and thus, increasing brake stack or heat sink brake life the CMC core is illustrated. In various embodiments, at block 702, a brake disk that is a CMC core is received. At block 704, an engineered ceramic material is formed or adhered, among others, onto a wear surface of the CMC core to function as a wear material that wears instead of the carbon of the CMC core itself. In various embodiments, the engineered ceramic material may be formed or adhered, among others, to the CMC core using plasma spraying, electron beam physical vapor deposition, or similar physical vapor deposition technique, among others, to physically build up a coating of the engineered ceramic material on the CMC core. In various embodiments, the engineered ceramic material may be one or more of silicon nitride ($Si_3N_4$), partially stabilized zirconium oxides ($ZrO_2$), or aluminum oxide ($Al_2O_3$), and various combinations of the same, among others. In various embodiments, a thickness of the engineered ceramic material may be between 0.10 inches (0.254 centimeters) and 0.25 inches (0.635 centimeters) thick. In various embodiments, a thickness of the engineered ceramic material may be between 0.13 inches (0.3302 centimeters) and 0.22 inches (0.5588 centimeters) thick. In various embodiments, a thickness of the CMC core may be between 0.20 inches (0.508 centimeter) and 2 inches (5.08 centimeters) thick. In various embodiments, the CMC core may be between 0.23 inches (0.5842 centimeter) and 1.25 inches (3.175 centimeters) thick. In various embodiments, the CMC core may be between 0.25 inches (0.635 centimeter) and 0.750 inches (1.905 centimeters) thick. In various embodiments, the CMC core provides for overcoming the decrease in thermal conductivity caused by placing the engineered ceramic material at the wear interfaces while introducing a more durable wearing material. In various embodiments, at block 706, the engineered ceramic material coated CMC core may then be installed in a multi-disk brake system, such as the multi-disk brake system 20 of FIG. 1.

Figure 8:
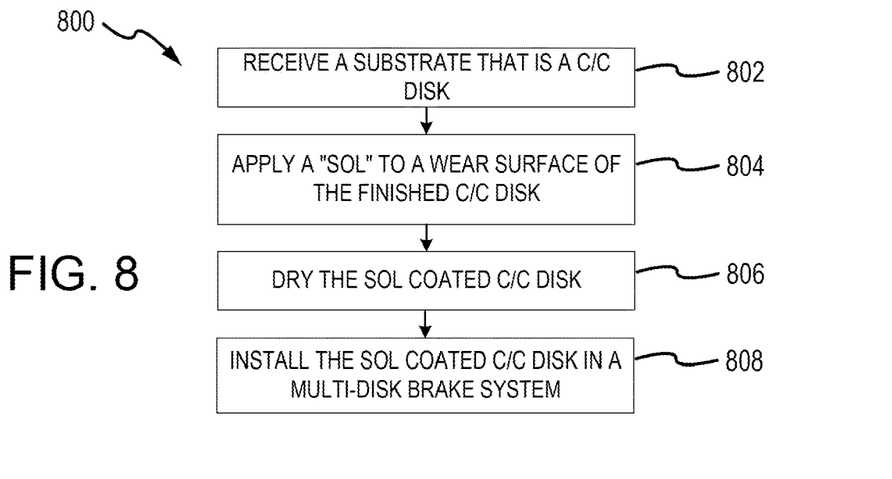
FIG. 8 illustrates a flowchart a method for decreasing brake stack or heat sink wear rate of a C/C disk and, thus, increasing brake stack or heat sink brake life of the C/C disk, in accordance with various embodiments.

Referring now to FIG. 8, in accordance with various embodiments, a flowchart illustrating a method 800 for decreasing brake stack or heat sink wear rate of a C/C disk and thus, increasing brake stack or heat sink brake life of the C/C disk is illustrated. In various embodiments, at block 802, a brake disk that is a finished C/C disk is received. At block 804, nano ceramic binary oxide, doped nano ceramic binary oxide, or nano ceramic ternary oxide particulates suspended in a ceramic solution, referred to as a "sol," is applied to a wear surface of the finished C/C disk. In various embodiments, the particulates have an average particle size of between 10 nanometers (0.3937 microinch) and 250 nanometers (9.843 microinches). In various embodiments, the particulates have an average particle size of between 10 nanometers (0.3937 microinch) and 150 nanometers (5.906 microinches). In various embodiments, the particulates have an average particle size of between 10 nanometers (0.3937 microinch) and 50 nanometers (1.969 microinches). In various embodiments, the sol may be applied via numerous routes such as spraying, painting, smearing, brushing, sorption, cold spraying, sputtering, pouring, sprinkling, or peptization, among others, to physically coat the wear surface of the C/C disk. In various embodiments, the sol may be applied in small quantities at the disk wear surfaces like a surface coating. In various embodiments, when the sol is applied, the sol may penetrate between 0.005 inches and 0.25 inches into the C/C disk. In various embodiments, when the sol is applied, the sol may penetrate between 0.025 inches and 0.10 inches into the C/C disk. In various embodiments, when the sol is applied, the sol may penetrate less than 0.05 inches into the C/C disk. In that regard, in various embodiments, an amount of sol applied may be between 0.025 cubic centimeters (0.001526 cubic inches) and 3 cubic centimeters (0.1831 cubic inches) per disk wear surface. In various embodiments, an amount of sol applied may be between 0.075 cubic centimeters (0.004577 cubic inches) and 2.5 cubic centimeters (0.1526 cubic inches) per disk wear surface. In that regard, in various embodiments, an amount of sol applied may be between 0.125 cubic centimeters (0.007628 cubic inches) and 2 cubic centimeters (0.122 cubic inches) per disk wear surface. In various embodiments, during the operation of the brake, the nano ceramic binary oxide, doped nano ceramic binary oxide, or nano ceramic ternary oxide is mixed into the carbon wear debris as its generated which then has the ability to drastically reduce wear rates and increase brake life. In various embodiments, when other carbon wear debris oxidizes away, the already oxidized ceramics remain without needed to be regenerated like current wear debris produced from C/C disks and may regenerate carbon wear debris quickly to assist in brake lubrication.

In various embodiments, the nano ceramic binary oxide particulates may include zirconium oxide ($ZrO_2$), aluminum oxide ($Al_2O_3$), or magnesium oxide (MgO), and various combinations of the same, among others. In various embodiments, the nano ceramic binary oxide particulates may include lithium oxide ($Li_2O$), beryllium oxide (BeO), calcium oxide (CaO), strontium oxide (SrO), or barium oxide (BaO), and various combinations of the same, among others. In various embodiments, the nano ceramic binary oxide particulates may include scandium(III) oxide ($Sc_2O_3$), yttrium oxide ($Y_2O_3$), cobalt(II) oxide (CoO), or nickel oxide (NiO), and various combinations of the same, among others. In various embodiments, the nano ceramic binary oxide particulates may include silicon oxide ($SiO_2$), titanium oxide ($TiO_2$), or hafnium(IV) oxide ($HfO_2$), and various combinations of the same, among others. In various embodiments, the nano ceramic binary oxide particulates may include vanadium(II) oxide (VO), vanadium(III) oxide ($V_2O_3$), vanadium oxide ($VO_2$), niobium(II) oxide (NbO), tantalum oxide ($Ta_2O_5$), tungsten(IV) oxide ($WO_2$), or tungsten trioxide ($WO_3$), and various combinations of the same, among others. In various embodiments, the nano ceramic binary oxide particulates may include gallium oxide (GaO), indium oxide ($In_2O_3$), or tin(IV) oxide ($SnO_2$), and various combinations of the same, among others. In various embodiments, the nano ceramic binary oxide particulates may include lanthanum oxide ($La_2O_3$), cerium oxide ($CeO_2$), praseodymium(III,IV) oxide ($Pr_6O_{11}$), or neodymium oxide ($Nd_2O_3$), and various combinations of the same, among others. In various embodiments, the nano ceramic binary oxide particulates may include samarium oxide ($Sm_2O_3$), europium oxide ($Eu_2O_3$), gadolinium oxide ($Gd_2O_3$), terbium oxide ($Tb_2O_3$), or dysprosium oxide ($Dy_2O_3$), and various combinations of the same, among others. In various embodiments, the nano ceramic binary oxide particulates may include holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$), and various combinations of the same, among others. In various embodiments, the doped nano ceramic binary oxide particulates may include yttrium oxide-stabilized zirconium(IV) oxide (YSZ) or zirconium (IV) oxide toughened aluminum oxide (ZTA), and various combinations of the same, among others. In various embodiments, the nano ceramic ternary oxide particulates may include lithium silicate ($Li_2SiO_3$), mullite ($Si_2Al_6O_{13}$), calcium silicate ($Ca_2SiO_4$), or hafnium orthosilicate ($HfSiO_4$), and various combinations of the same, among others. In various embodiments, the nano ceramic ternary oxide particulates may include lithium titanate ($Li_2TiO_3$), aluminum titanate ($Al_2TiO_5$), calcium titanate ($CaTiO_3$), strontium titanate ($SrTiO_3$), barium titanate ($BaTiO_3$), or hafnium titanate ($HfTiO_4$), and various combinations of the same, among others. In various embodiments, the nano ceramic ternary oxide particulates may include strontium zirconate ($SrZrO_3$) or barium zirconate ($BaZrO_3$), and various combinations of the same, among others. In various embodiments, at block 806, the sol coated C/C disk is dried and then, at block 808, the sol coated C/C disk may then be installed in a multi-disk brake system, such as the multi-disk brake system 20 of FIG. 1.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C. B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for decreasing a wear rate of a brake stack or a heat sink wear rate and increasing a brake life of the brake stack or the heat sink, comprising: coating a wear surface of a brake disk with an engineered ceramic material, thereby forming a coated brake disk, wherein the engineered ceramic material is silicon nitride ($Si_3N_4$) and at least one of partially stabilized zirconium oxides (ZrO2) or aluminum oxide (Al2O3); and installing the coated brake disk in a multi-disk brake system.

2. The method of claim 1, wherein the brake disk is a ceramic matrix composite (CMC) core with wear liners affixed to either side of the CMC core, wherein:
the engineered ceramic material is applied to a wear surface of the wear liners, wherein the engineered ceramic material is applied using at least one of plasma spraying or electron beam physical vapor deposition, or
the wear liners are formed using the engineered ceramic material via net-shape pressing and densifying via pressured or pressureless sintering to form wear liners comprised entirely of the engineered ceramic material that are then mechanically affixed to either side of the CMC core.

3. The method of claim 1, wherein the brake disk is a ceramic matrix composite (CMC) core, wherein the engineered ceramic material is applied to a wear surface of the CMC core, and wherein the engineered ceramic material is applied using at least one of plasma spraying, electron beam physical vapor deposition, or physical vapor deposition technique.

4. The method of claim 1, wherein the brake disk is coated with the engineered ceramic material and a ceramic solution thereby forming the coated brake disk.

5. The method of claim 4, wherein the brake disk is a carbon/carbon (C/C) disk and wherein the ceramic solution is applied to a wear surface of the C/C disk via at least one of spraying, painting, smearing, brushing, sorption, cold spraying, sputtering, pouring, sprinkling, or peptization.

6. The method of claim 5, wherein the ceramic solution comprises at least one of nano ceramic binary oxide particulates, doped nano ceramic binary oxide particulates, or nano ceramic ternary oxide particulates.

7. The method of claim 6, wherein the nano ceramic binary oxide particulates comprise at least one of zirconium oxide ($ZrO_2$), aluminum oxide ($Al_2O_3$), or magnesium oxide (MgO).

8. The method of claim 6, wherein the nano ceramic binary oxide particulates comprise at least one of lithium oxide ($Li_2O$), beryllium oxide (BeO), calcium oxide (CaO), strontium oxide (SrO), or barium oxide (BaO).

9. The method of claim 6, wherein the nano ceramic binary oxide particulates comprise at least one of scandium (III) oxide ($Sc_2O_3$), yttrium oxide ($Y_2O_3$), cobalt(II) oxide (CoO), or nickel oxide (NiO).

10. The method of claim 6, wherein the nano ceramic binary oxide particulates comprise at least one of silicon oxide ($SiO_2$), titanium oxide ($TiO_2$), or hafnium(IV) oxide ($HfO_2$).

11. The method of claim 6, wherein the nano ceramic binary oxide particulates comprise at least one of vanadium (II) oxide (VO), vanadium(III) oxide ($V_2O_3$), vanadium oxide ($VO_2$), niobium(II) oxide (NbO), tantalum oxide ($Ta_2O_5$), tungsten(IV) oxide ($WO_2$), or tungsten trioxide ($WO_3$).

12. The method of claim 6, wherein the nano ceramic binary oxide particulates comprise at least one of gallium oxide (GaO), indium oxide ($In_2O_3$), or tin(IV) oxide ($SnO_2$).

13. The method of claim 6, wherein the nano ceramic binary oxide particulates comprise at least one of lanthanum oxide ($La_2O_3$), cerium dioxide ($CeO_2$), praseodymium(III, IV) oxide ($Pr_6O_{11}$), or neodymium oxide ($Nd_2O_3$).

14. The method of claim 6, wherein the nano ceramic binary oxide particulates comprise at least one of samarium oxide ($Sm_2O_3$), europium oxide ($Eu_2O_3$), gadolinium oxide ($Gd_2O_3$), terbium oxide ($Tb_2O_3$), or dysprosium oxide ($Dy_2O_3$).

15. The method of claim 6, wherein the nano ceramic binary oxide particulates comprise at least one of holmium oxide ($Ho_2O_3$), erbium oxide ($Er_2O_3$), thulium oxide ($Tm_2O_3$), ytterbium oxide ($Yb_2O_3$), or lutetium oxide ($Lu_2O_3$).

16. The method of claim 6, wherein the doped nano ceramic binary oxide particulates comprise at least one of yttrium oxide stabilized zirconium(IV) oxide (YSZ) or zirconium(IV) oxide toughened aluminum oxide (ZTA).

17. The method of claim 6, wherein the nano ceramic ternary oxide particulates comprise at least one of lithium silicate ($Li_2SiO_3$), mullite ($Si_2Al_6O_{13}$), calcium silicate ($Ca_2SiO_4$), or hafnium orthosilicate ($HfSiO_4$).

18. The method of claim 6, wherein the nano ceramic ternary oxide particulates comprise at least one of lithium titanate ($Li_2TiO_3$), aluminum titanate ($Al_2TiO_5$), calcium titanate ($CaTiO_3$), strontium titanate ($SrTiO_3$), barium titanate ($BaTiO_3$), or hafnium titanate ($HfTiO_4$).

19. The method of claim 6, wherein the nano ceramic ternary oxide particulates comprise at least one of strontium zirconate ($SrZrO_3$) or barium zirconate ($BaZrO_3$).

* * * * *